(12) United States Patent
Dietz et al.

(10) Patent No.: US 9,454,227 B2
(45) Date of Patent: Sep. 27, 2016

(54) HAPTIC OPERATING DEVICE

(75) Inventors: Armin Dietz, Regensburg (DE); Heinz Pofahl, Gera (DE)

(73) Assignee: Continental Automotive GmbH, Hannover (DE)

( * ) Notice: Subject to any disclaimer, the term of this patent is extended or adjusted under 35 U.S.C. 154(b) by 631 days.

(21) Appl. No.: 13/130,486

(22) PCT Filed: Oct. 23, 2009

(86) PCT No.: PCT/EP2009/063975
§ 371 (c)(1),
(2), (4) Date: May 20, 2011

(87) PCT Pub. No.: WO2010/057741
PCT Pub. Date: May 27, 2010

(65) Prior Publication Data
US 2011/0221703 A1    Sep. 15, 2011

(30) Foreign Application Priority Data
Nov. 21, 2008   (DE) .......................... 10 2008 058 566

(51) Int. Cl.
*G06F 3/01* (2006.01)
*B60K 37/06* (2006.01)
*G06F 3/041* (2006.01)

(52) U.S. Cl.
CPC .............. *G06F 3/016* (2013.01); *B60K 37/06* (2013.01); *G06F 3/041* (2013.01); *B60K 2350/1024* (2013.01)

(58) Field of Classification Search
USPC ...................... 345/173–178; 178/18.01–20.04
See application file for complete search history.

(56) References Cited

U.S. PATENT DOCUMENTS

| | | | |
|---|---|---|---|
| 5,702,779 A * | 12/1997 | Siebelink et al. ............... 428/14 |
| 2003/0222858 A1 * | 12/2003 | Kobayashi ..................... 345/173 |
| 2006/0146036 A1 * | 7/2006 | Prados et al. ................. 345/173 |
| 2006/0146037 A1 | 7/2006 | Prados et al. |
| 2007/0146343 A1 | 6/2007 | Prados |
| 2008/0191869 A1 | 8/2008 | Garcia-Briz |
| 2009/0051662 A1 | 2/2009 | Klein et al. |
| 2009/0174672 A1 * | 7/2009 | Schmidt ......................... 345/173 |

FOREIGN PATENT DOCUMENTS

| | | |
|---|---|---|
| DE | 201 10 769 U1 | 11/2001 |
| DE | 10 2005 038 161 A1 | 7/2006 |
| DE | 10 2005 011 633 A1 | 9/2006 |
| DE | 10 2008 007 194 A1 | 8/2008 |
| EP | 0 334 745 A1 | 9/1989 |
| JP | 2007-034954 A | 2/2007 |
| WO | WO 02/073587 A1 | 9/2002 |

OTHER PUBLICATIONS

Office Action dated Jul. 9, 2015 which issued in the corresponding Korean Patent Application No. 10-2011-7011390.

* cited by examiner

*Primary Examiner* — Lixi C Simpson
*Assistant Examiner* — Ngan T Pham Lu
(74) *Attorney, Agent, or Firm* — Cozen O'Connor

(57) ABSTRACT

A haptic control device, particularly for motor vehicles, with a touchpad including at least one contact-sensitive touch. A control signal can be triggered upon contact with the touch region, and the touchpad can be moveably driven by a drive in the plane of the touchpad in a certain rhythm. The touchpad is connected to a stationary carrier by one or more flexible connecting elements. The flexible connecting element or elements are spring arms, one end of which is connected to the carrier and the other end of which is connected to the touchpad.

36 Claims, 2 Drawing Sheets

HAPTIC OPERATING DEVICE

PRIORITY CLAIM

This is a U.S. national stage of Application No. PCT/EP2009/063975, filed on Nov. 23, 2009, which claims priority to German Application No: 10 2008 058 566.1, filed: Nov. 21, 2008, the contents of which are incorporated herein by reference.

BACKGROUND OF THE INVENTION

1. Field of the Invention

The invention relates to a haptic operating device, particularly for motor vehicles, comprising a touch panel having at least one touch-sensitive area, a switching signal being able to be triggered when the touch area is touched and the touch panel being able to be activated by a motion drive so as to be able to move at a certain rhythm in the plane of the touch panel, the touch panel being connected to a fixed support by one or more flexible connecting elements.

2. Related Art

In such haptic operating devices that serve for triggering a switching signal, when a touch area is actuated, movements of the touch panel are triggered at a certain rhythm to provide the operator with information that the switching signal has been correctly triggered.

SUMMARY OF THE INVENTION

It is an object of one embodiment of the invention to provide a haptic operating device of the aforementioned type which has a construction which is simple and is not susceptible to malfunction.

This object is achieved according to the invention by the flexible connecting element(s) being retaining arms which may be deflected in a flexible manner, one end thereof being connected to the support and the other end thereof being connected to the touch panel.

The small number of simple components thus avoids unpleasant noise development.

Thus in a simple embodiment the retaining arms may be metal strips.

If the retaining arms are spring arms, the support elements of the touch panel simultaneously cause the return of the deflected touch panel into its neutral position and thus fulfill a dual function.

Preferably, the retaining arm(s) is (are) arranged in one or more edge regions of the touch panel.

If the retaining arms are arranged on opposing edge regions of the touch panel, they form a parallelogram that provides a stable retention of the area.

Thus, in particular with large-surfaced touch panels, two or more retaining arms may be arranged on each edge region of the touch panel for the stable retention thereof.

The retaining arms may have a circular cross section.

If the retaining arms have a rectangular cross section, guided deflectability is restricted to a single direction of deflection that assists a stable hold.

Thus the direction of deflectability corresponds to the drive direction of the motion drive.

A regular parallelogram is thus achieved, by the longitudinal sides of the retaining arms arranged on opposing edge regions of the touch panel extending parallel to one another, so that the plane of the touch panel is always uniformly deflected.

For influencing the force-path-characteristic of the drive acting on the touch panel, the retaining arms may have a non-uniform cross section over their length from the support toward the touch panel.

It is understood that the retaining arms may also have a uniform cross section over their length from the support toward the touch panel.

In order to produce a braking effect at the end of a deflection stroke by the motion drive, the spring arms may have a cross section which tapers entirely or partially from the support toward the touch panel.

For stable positioning and easy mounting, the ends of the retaining arms on the support side are preferably fixedly clamped in bearing blocks, which are fixedly connected to the support.

For ensuring the flexibility of the connecting regions, the ends of the retaining arms on the support side may form bending joints, which are connected to the support and/or the ends of the retaining arms on the touch panel side may form bending joints, which are connected to the touch panel, so that it is avoided that the connecting regions are overloaded and the motion profile of the touch panel is affected.

For limiting the deflection movement of the touch panel, the retaining arms may be deflected from a neutral position until they come to bear against stops.

For damping the end of the deflection movement, the stops may have resilient damping elements.

The stops may be support surfaces which extend wholly or partially between the support and the touch panel.

If the support surfaces thus extend in a bulged manner toward the spring arms, the retaining arms when deflected increasingly bear against the support surfaces, which leads to increased braking of the deflection movement and thus a harsh impact being avoided.

Thus the support surfaces may have a bulged portion that alters in the extent to which it bulges, so that the braking path may be determined thereby. In particular, a non-linear activation may also be compensated by the motion drive, such as for example with a quadratically rising curve of the force characteristic, by a corresponding bulged portion that results in a linear motion sequence.

Preferably, the motion drive is a motion drive that is activated in a linear manner in a direction of movement.

The motion drive may be an electromechanical motion drive, such as for example a magnetic motion drive or a piezo-electric motion drive.

This is advantageous, as acceleration of the touch panel of up to 3 G and above, which is easily able to be grasped by the human hand, may thus be achieved.

However, any other motion drive, such as for example a pneumatic motion drive, may also be used.

In order to be able to produce a plurality of touch areas in a small space, the touch panel may have a plurality of touch-sensitive areas distributed over the touch panel and able to be actuated independently of one another, preferably the touch areas being able to be arranged in a matrix in order to be easily located by the operator.

In a simple embodiment, the touch areas may be piezo-electric and/or capacitive and/or resistive touch areas.

For haptic differentiation, various specific rhythms may be associated with different touch areas, in which the touch panel may be activated so as to be able to move.

In order to be able to assign the touch areas with the ability to be visually detected, in a simple manner the touch panel may be configured to be transparent at least in the region of the touch areas, one or more display devices fixedly connected to the support being arranged between the touch panel and the support.

A small constructional volume and an optionally flexible controllability is thus achieved by the display device being an optoelectrical display device, such as a liquid crystal display (LCD) or an organic light-emitting diode (OLED) or a vacuum fluorescent display (VFD).

Thus, an alphanumeric character and/or symbol which may be associated with the switching function of the associated touch area may preferably be represented by the display device.

To avoid operating errors caused by environmental effects, such as moisture and dust, the support and the touch panel may form two housing parts of a closed housing, in which at least the display device or the display plane thereof is arranged, and which are connected to each other by a sealing device so as to be able to move relative to each other in the plane of the touch panel or in a plane parallel to the touch panel.

An impairment to the visibility of the display area of the display device may be avoided by the housing.

In addition, the housing parts of the touch panel and the support may be adjacent to one another in the plane of the touch panel or in one or more planes parallel to the touch panel, the sealing device being arranged between adjacent regions of the touch panel and the support.

For the relative mobility, in this case the sealing device may be a resilient sealing element connected to the adjacent regions of the touch panel and the support.

For the relative mobility, in this case the sealing device may be a resilient sealing element, such as for example a diaphragm connected to the adjacent regions of the touch panel and the support.

To avoid influencing the motion profile, in particular in the event of wide fluctuations in the ambient temperature, as occur in a motor vehicle, for example, the resilient sealing element preferably consists of a material, the rigidity thereof being at least approximately constant in a temperature range of between −40° C. to +110° C.

To this end, the sealing element may consist of a plastics material.

In a further configuration of the sealing device which at least substantially avoids influencing the motion profile, a labyrinth seal comprising one or more labyrinths and forming a closed annular path may be arranged between the adjacent planes of the touch panel and the support are parallel to one another, the projections of the labyrinth seal protruding with a greater clearance into the grooves of the labyrinth seal, in a plane parallel to the plane of the touch panel, than the touch panel may be moved by the motion drive relative to the support.

Preferably, in this case the annular path has a rectangular characteristic, the straight lines of the rectangle being connected to one another by radii.

BRIEF DESCRIPTION OF DRAWINGS

Exemplary embodiments of the invention are shown in the drawings and are described in more detail hereinafter.

In the drawings.

DETAILED DESCRIPTION OF DRAWINGS

Figure 1:
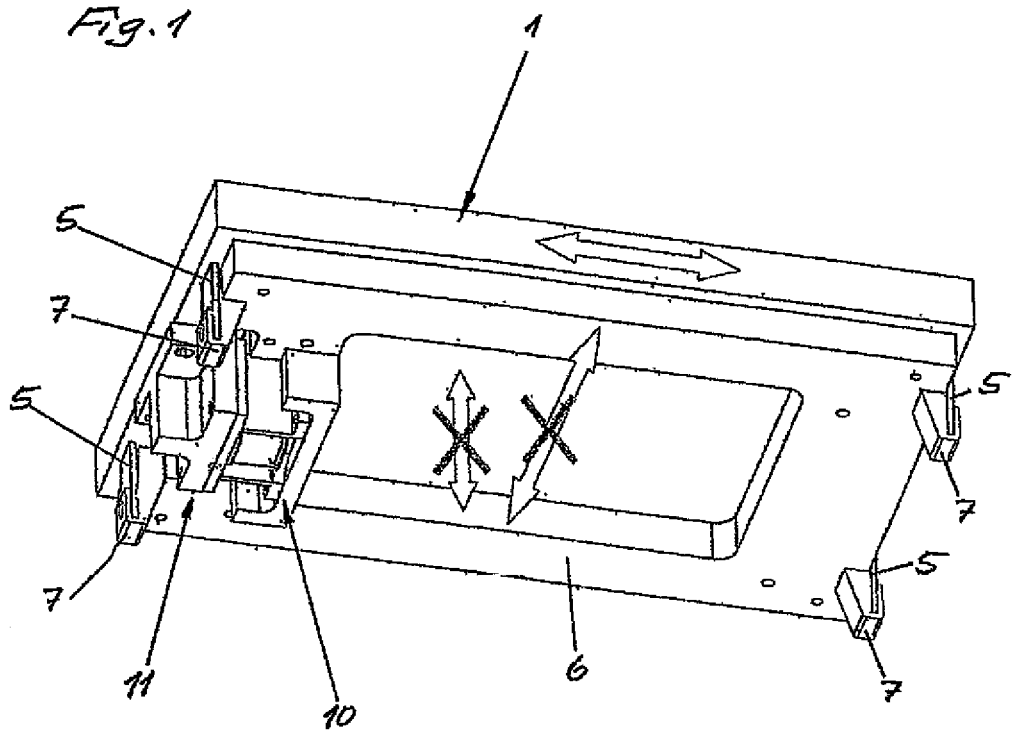
FIG. 1 is a perspective view from below of a first exemplary embodiment of an operating device.

The operating devices shown have a touch panel 1, the upper face thereof being provided with a transparent film 2, which has a plurality of transparent touch-sensitive areas, not-shown.

The touch areas may be capacitive touch areas which, when touched, cause a switching signal to be triggered, which may be forwarded to a device to be actuated.

The touch panel 1 has a rectangular frame 3, the internal region thereof being sealed by a transparent plate 4, to which the film 2 is applied.

Two spring arms 5 with a rectangular cross section are arranged at a distance from one another, in each case with one end thereof, on the short sides of the frame 3, said spring arms protruding at right angles away from the side of the touch panel 1, which is remote from the film 2.

The spring arms 5 extend with their longitudinal sides parallel to the short sides of the frame 3 and are able to be fastened with their second ends to a support 6.

Figure 2:
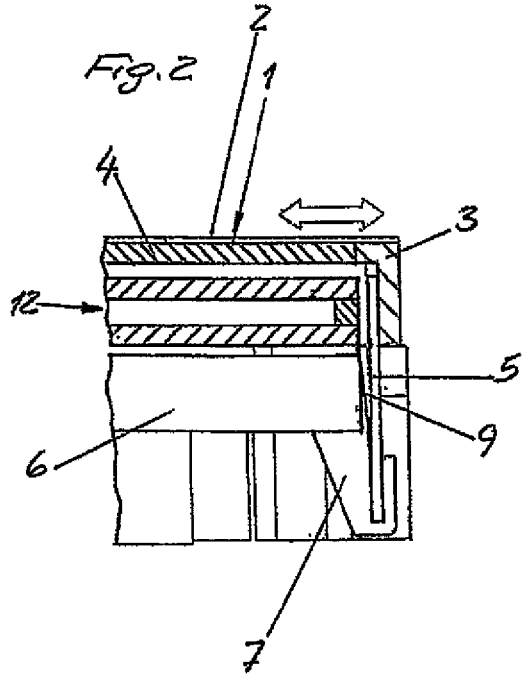
FIG. 2 is a detail of the operating device according to FIG. 1 in cross section.
Figure 3:
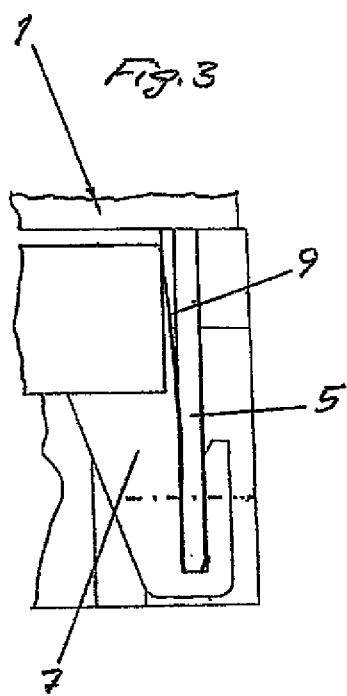
FIG. 3 is an enlarged detail of the operating device according to FIG. 1.
Figure 4:
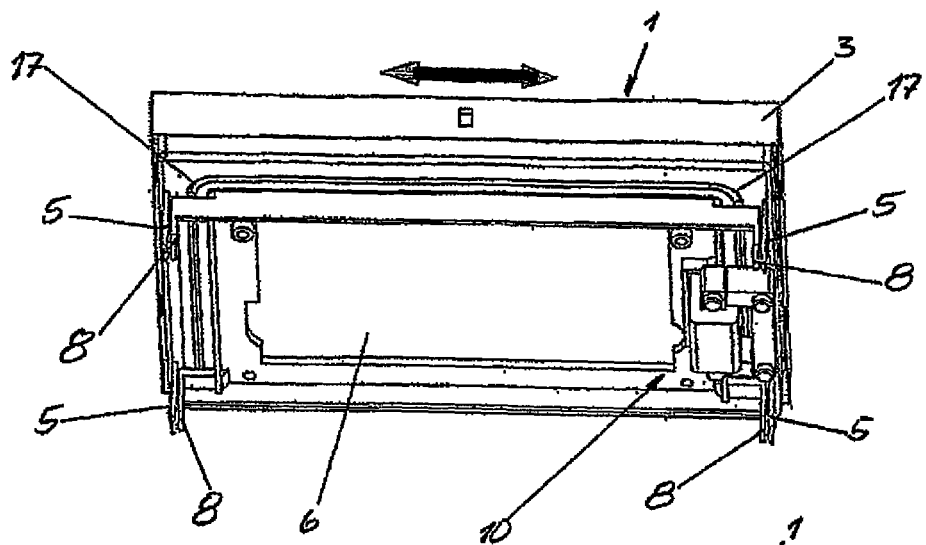
FIG. 4 is a perspective view from below of a second exemplary embodiment of an operating device.
Figure 5:
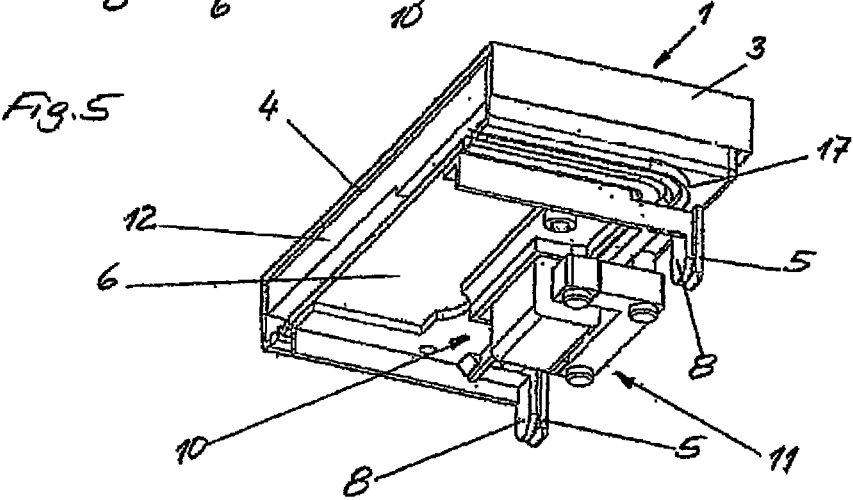
FIG. 5 is a second perspective partial view from below of the operating device according to FIG. 4.
Figure 6:
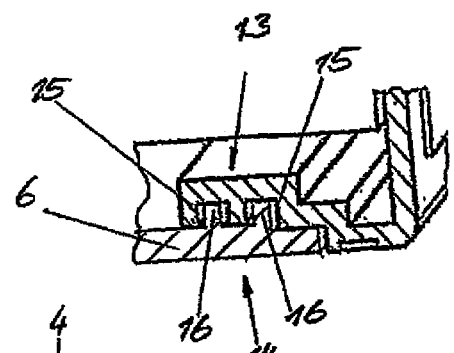
FIG. 6 is a perspective cross-sectional view of the operating device according to FIG. 4
Figure 7:
FIG. 7 is a perspective view of an enlarged detail of the operating device according to FIG. 4.

In the exemplary embodiment of FIGS. 1 to 3, the second ends of the spring arms 5 are fixedly clamped in bearing blocks 7 of the support 6.

In the exemplary embodiment of FIGS. 4 to 7, the support 6 has tabs 8, the free ends thereof being connected to the free ends of the spring arms 5.

The bearing blocks 7 and the tabs 8 are arranged on the side of the respective spring arms 5 facing the center of the support 6, and on the side support surfaces 9 thereof facing the spring arms 5 have a bulged portion that extends over part of the distance between the support 6 and the touch panel 1.

Proceeding from the fastening points of the spring arms 5 on the bearing blocks 7 and/or the tabs 8, the support surfaces 9 move toward the central region of the support 6 in the direction of the other end thereof.

As a result, the touch panel 1, borne by the spring arms 5 and connected thereby to the support 6, may be deflected relative to the support 6 in the direction of its longitudinal extension.

Thus the spring arms 5 form a parallelogram, so that deflections other than in the direction of the longitudinal extension of the touch panel 1 are not possible.

A magnetic motion drive 10 is further arranged on the support 6, said magnetic motion drive acting on an armature 11 connected to the touch panel 1 for deflecting the touch panel 1 when a touch area is touched and the switching signal is triggered.

This deflection takes place over a path that alternates from 0.2 mm to 0.5 mm, a separate rhythm being assigned to each touch area, in which when a touch area is touched the touch panel 1 is activated in an oscillating manner by the magnetic motion drive 10.

With each deflection of the touch panel 1, the spring arms 5 on the one short side of the frame 3 increasingly come to bear against bulged portions of the support surfaces 9 assigned thereto, so that at the end of a deflection the spring arms 5 at least substantially bear against the support surfaces 9 associated therewith.

When the magnetic motion drive 10 is switched off, the swinging back takes place, therefore, by the spring force of the spring arms 5.

Thus the two other spring arms 5 come to bear against the support surfaces 9 associated therewith.

This oscillating rhythm is able to be detected and identified haptically by the operator touching the touch area.

Information that the switching signal has been triggered and information about which touch area has been actuated, by identifying the specific rhythm, is provided haptically.

Thus the operator is able to establish whether the touch area to be actuated by the operator has actually been touched.

In order initially to be able to identify visually the position of the respective touch area to be actuated on the touch panel 1, on the side of the touch panel 1 remote from the film 2, a liquid crystal display 12 is arranged on the support 6, the characters and/or symbols of said liquid crystal display, which are shown, being able to be seen by the operator through the transparent plate 4 of the touch panel 1.

Thus behind every touch area a character and/or symbol assigned thereto is arranged.

In the exemplary embodiment of FIGS. 4 to 7, the support and touch panel 1 form two housing parts of a closed housing.

The touch panel 1 is thus configured as a box which is open on the side opposing the plate 4, and which at its opening region has a peripheral sealing region 13 parallel to the plate 4.

A planar sealing region 14 of the support 6 configured in a plate-like manner bears against this sealing region 13, in a plane parallel thereto.

Two continuous peripheral grooves 15 are formed on the sealing region 13 of the touch panel 1, extending parallel to one another along the opening region and forming an annular path, and into which corresponding continuous peripheral projections 16 of the sealing region 14 of the support 6 protrude.

The annular paths consisting of the grooves 15 and projections 16, which form a labyrinth seal, have a rectangular characteristic, the straight lines of the rectangle being connected to one another by radii 17.

In order to permit the unhindered deflection movement of the touch panel 1 relative to the support 6, the grooves 15 have such a width that the projections 16 do not come to bear against the groove walls when the touch panel 1 is deflected.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A haptic operating device, comprising:
   a touch panel having at least one touch-sensitive area configured to trigger a switching signal when the at least one touch-sensitive area is touched;
   a motion drive configured to move at a certain rhythm in a plane of the touch panel in response to the switching signal;
   a fixed support;
   one or more flexible connecting elements by which the touch panel is connected to the fixed support, each flexible connecting element configured as a deflectable retaining spring arm that is deflectable in a flexible manner, one end thereof being connected to the support and the other end thereof being connected to the touch panel, each spring arm protruding from the touch panel at right angles from the plane of the touch panel,
   wherein the spring arms are configured as a parallelogram, so as to ensure that deflections other than in a longitudinal extension of the touch panel cannot occur.

2. The display unit as claimed in claim 1, wherein each spring arm is arranged in an edge region of the touch panel.

3. The display unit as claimed in claim 2, wherein the spring arms are arranged on opposing edge regions of the touch panel.

4. The display unit as claimed in claim 3, wherein two or more spring arms are arranged on each edge region of the touch panel.

5. The display unit as claimed in claim 1, wherein each retaining arm has a circular cross section.

6. The display unit as claimed in claim 1, wherein each retaining arm has a rectangular cross section.

7. The display unit as claimed in claim 6, wherein a longitudinal side of each retaining arm arranged on opposing edge regions of the touch panel extend parallel to one another.

8. The display unit as claimed in claim 1, wherein each retaining arm has a non-uniform cross section over their length from the support toward the touch panel.

9. The display unit as claimed in claim 8, wherein each retaining arm has a cross section that tapers at least partially from the support toward the touch panel.

10. The display unit as claimed in claim 1, wherein the ends of each retaining arm on the support side are fixedly clamped in bearing blocks that are fixedly connected to the support.

11. The display unit as claimed in claim 1, wherein respective ends of each retaining arm on the support side form a bending joint that is connected to at least one of the support and the end of the retaining arm on the touch panel side to form a bending joint that is connected to the touch panel.

12. The display unit as claimed in claim 1, wherein the retaining arms are each configured to be deflected from a neutral position until they come to bear against a respective stop.

13. The display unit as claimed in claim 12, wherein the respective stops are support surfaces that extend at least partially between the support and the touch panel.

14. The display unit as claimed in claim 13, wherein the support surfaces extend in a bulged manner toward the retaining arms.

15. The display unit as claimed in claim 14, wherein the support surfaces have a bulged portion that alters in the extent to which it bulges.

16. The display unit as claimed in claim 1, wherein the motion drive is a motion drive that is activated in a linear manner in a direction of movement.

17. The display unit as claimed in claim 16, wherein the motion drive is an electromechanical motion drive.

18. The display unit as claimed in claim 17, wherein the motion drive is a magnetic motion drive.

19. The display unit as claimed in claim 17, wherein the motion drive is a piezo-electric motion drive.

20. The display unit as claimed in claim 16, wherein the motion drive is a pneumatic motion drive.

21. The display unit as claimed in claim 1, wherein the touch panel has a plurality of touch-sensitive areas distributed over the touch panel configured be actuated independently of one another.

22. The display unit as claimed in claim 21, wherein the plural touch areas are arranged in a matrix.

23. The display unit as claimed in claim 22, wherein the touch areas are at least one of piezo-electric, capacitive, and resistive touch areas.

24. The display unit as claimed in claim 23, wherein different ones of the plural touch areas are associated with various specific rhythms in which the touch panel is configured to be activated.

25. The display unit as claimed in claim 1, further comprising one or more display devices fixedly connected to the support being arranged between the touch panel and support, wherein the touch panel is configured to be transparent at least in a region of the touch areas.

26. The display unit as claimed in claim 25, wherein the display device is an optoelectrical display device.

27. The display unit as claimed in claim 26, wherein the optoelectrical display device is one of a liquid crystal display (LED), an organic light-emitting diode (OLED), and a vacuum fluorescent display (VFD).

28. The display unit as claimed in claim 27, wherein one of an alphanumerical character and a symbol associated with the switching function of the associated touch area is represented by the display device.

29. The display unit as claimed in claim 1, wherein the support and the touch panel form two housing parts of a closed housing, in which at least one of the display device and the display plane thereof is arranged which are connected to each other by a sealing device so as to be able to move relative to each other in one of the plane of the touch panel and in a plane parallel to the touch panel.

30. The display unit as claimed in claim 29, wherein the housing parts of the touch panel and the support are adjacent to one another in the plane of the touch panel or in one or more planes parallel to the touch panel, the sealing device being arranged between adjacent regions of the touch panel and the support.

31. The display unit as claimed in claim 30, wherein the sealing device is a resilient sealing element connected to adjacent regions of the touch panel and the support.

32. The display unit as claimed in claim 31, wherein the resilient sealing element is a diaphragm.

33. The display unit as claimed in claim 32, wherein the resilient sealing element comprises a material having a rigidity being approximately constant in a temperature range between −40° C. to +110° C.

34. The display unit as claimed in claim 33, wherein the sealing element comprises a plastic material.

35. The display unit as claimed in claim 30, wherein a labyrinth seal comprising one or more labyrinths form a closed annular path between adjacent planes of the touch panel and the support, which are parallel to one another, the projections of the labyrinth seal protruding with a greater clearance into the grooves of the labyrinth seal, in a plane parallel to the plane of the touch panel, than the touch panel may be moved by the motion drive relative to the support.

36. The display unit as claimed in claim 35, wherein the annular path has a substantially rectangular characteristic, the straight lines of the rectangle being connected together by radii.

\* \* \* \* \*